United States Patent [19]

Ikeda et al.

[11] 4,199,718
[45] Apr. 22, 1980

[54] BEARING WEAR DETECTOR FOR AC ROTARY ELECTRIC INSTRUMENT

[75] Inventors: Hiroshi Ikeda; Osamu Ishimaru; Teruyoshi Nakatake; Tetsuzo Sakamoto, all of Kita-Kyushu, Japan

[73] Assignee: Nikkiso Co., Ltd., Tokyo, Japan

[21] Appl. No.: 791,249

[22] Filed: Apr. 27, 1977

[30] Foreign Application Priority Data

Apr. 28, 1976 [JP] Japan ................................. 51-48924

[51] Int. Cl.² ...................... G01R 31/00; G01R 33/00
[52] U.S. Cl. ............................ 324/158 MG; 324/207; 340/682
[58] Field of Search .......... 324/158 MG, 34 E, 34 D, 324/34 PS, 34 TK, 61 R, 61 P, 207; 73/462; 340/282, 682

[56] References Cited

U.S. PATENT DOCUMENTS

| | | | |
|---|---|---|---|
| 2,939,074 | 5/1960 | Perrett | 324/158 MG |
| 3,109,095 | 10/1963 | Van Horne | 324/34 TK |
| 3,381,216 | 4/1968 | Sibley, Jr. et al. | 324/207 |

FOREIGN PATENT DOCUMENTS 450290  1/1971  U.S.S.R. ......................... 324/158 MG

*Primary Examiner*—Rudolph V. Rolinec
*Assistant Examiner*—Ernest F. Karlsen

[57] ABSTRACT

A bearing wear detector for an AC rotary electric instrument such as an electric motor or a generator in which more than three detecting coils are mounted around a core of the electric instrument having poles of three or not three multiples at a relative space angle and the detecting coils are connected in series to obtain a resultant voltage.

7 Claims, 6 Drawing Figures

BEARING WEAR DETECTOR FOR AC ROTARY ELECTRIC INSTRUMENT

This invention relates to an improved bearing wear detector and in particular to a device for detecting a voltage generated by displacement of a rotor caused due to bearing wear of an AC rotary electric instrument.

An axle bearing for the canned motor pump, for example, a sleeve bearing of carbon type the durability of which is relatively unstable in usual use under various conditions. However, a high reliability is required for the canned motor pump which is incooperated into a plant as one of the important components.

In one of the bearing wear detectors heretofore used, two detecting coils are arranged in a stator of an AC rotary electric instrument at a specific spaced angle and connected in series to detect an induced voltage. When the bearing wear detector of this conventional type is mounted in a slot of a stator core of the known electric instrument, a detection of the bearing wear is ineffective if a displacement of the rotor caused due to the bearing wear is directed to a direction normal or substantially normal to a plane extending between the two detecting coils. On the other hand, the detection sensitivity will be more increased when the direction of the displacement comes near a plane extending between the two detecting coils. Namely, the conventional bearing wear detector has a directivity in the detection sensitivity.

By the way, in a rotary electric instrument commonly used, the direction of the axial load is changed due to a mounting angle against a cooperative machine, a weight of the load and the like.

Generally, on designing an electric motor, the direction of the load power applied to the bearing or a power applied to the radial direction of the rotor is indefinite. For example, in the canned motor pump, a direction of a load reaction applied to the axis is changed on account of variations in physical property, flow rate, liquid pressure and the like. In case the detecting coils are arranged in the upper and lower positions of a turning axis and the load reaction is applied to a horizontal direction to cause the bearing wear in the horizontal direction, these detecting coils are not sensitive to the bearing wear. To prevent such defect, the number of the detecting coils must be increased, otherwise the direction of the measurement could only be changed with cumbersome treatment in manufacture and operation.

Generally, a direction of the load reaction is indefinite and hence the direction of the bearing wear or the direction of the displacement of the rotor is not determinable. The conventional bearing wear detector having the directivity in the measurement therefore is inconvenient for the practical use.

A general object of the invention is to provide an improved bearing wear detector which is free from the directivity in the measuring direction but has an isotropy in the measuring sensitivity against the bearing wear.

To achieve the foregoing purpose in accordance with the present invention, three detecting coils are mounted around a core of the AC rotary electric instrument, having poles other than three multiples, at a space angle of approximately 120° and these three detecting coils are connected in series to obtain a resultant voltage.

In another aspect of the invention, four detecting coils are mounted around a core of the AC rotary electric instrument having poles of three but not four multiples at a space angle of approximately 90° and these four detecting coils are connected in series to obtain a resultant voltage.

Other objects and advantageous features of the invention will be apparent from the description and claims.

The nature and characteristic features of the invention will be more readily understood from the following description taken in connection with the accompanying drawings forming part thereof, in which.

Figure 1:
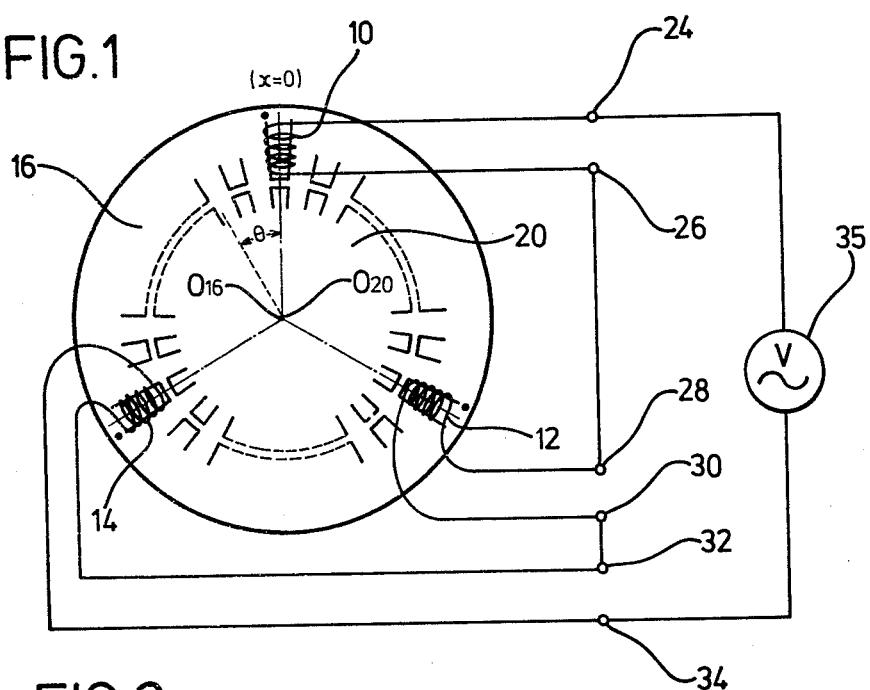
FIG. 1 is a schematic block diagram showing one embodiment of the invention.

In FIG. 1, the detecting coils 10, 12 and 14 are mounted on a stator 16 in the relative positions at a space angle of approximately 120°. It is a subject of the invention to measure a possible displacement of an axis $O_{20}$; of a rotor 20 from an axis $O_{16}$ of the stator 16. The output terminals 24, 26, 28, 30, 32 and 34 of the detecting coils 10, 12 and 14 are connected in series to measure a resultant voltage thereby to measure the displacement between the axis $O_{20}$ and $O_{16}$.

The theory of the present invention will be more fully described with reference to the following mathematical analysis.

A main magnetic field (Ag) may have the following equation:

$$Ag(x,t) = A \cos p(x - w_s t + \alpha_1) \quad (I)$$

in which A stands for an amplitude, p is a polar logarithm, $\omega_s$ an angular velocity, x an angle at a fixed coordinate, t a time and $\alpha_1$ is an arbitrary phase angle.

Provided a magnetic flux passing through an area element on the stator tooth surface corresponding to a microangle $\Delta x$ is $\Delta \Phi$, we obtain, $$\Delta \Phi = Ag(x,t) \cdot \Lambda g \cdot \Delta x$$

hence $$d\Phi/dx = Ag(x,t) \cdot \Lambda g$$

wherein g is a permeance of the area element and this permeance g is equivalent to an average permeance $\Lambda_o$ of a clearance to which a permeance wave of the rotor channel is superimposed.

Assuming the permeance wave of the rotor channel is a sinusoidal wave with provisions of a proportion ki of an amplitude in relation to the average permeance $\Lambda_o$, a number $N_2$ of the rotor channel, an angular velocity $\omega$ of the rotor, an arbitrary phase angle $\alpha_2$ to obtain a permeance (x,t) as a function of an angle x to a time t, the permeance $\Lambda g(x,t)$ has:

$$\Lambda g(x,t) = \Lambda_o \{1 + k \cos N_2(x - \omega t + \alpha_2)\} \quad (II)$$

wherein k is consant when the rotor is not displaced but has different values on account of the different angles if there is displacement of the rotor and has a maximum value in the eccentric direction but a minimum value in the direction opposite to displacement. Thus, k is varied smoothly to form a sinusoidal wave in accordance with offset from either directions.

Assuming the direction of the displacement lies in an angle $\theta$ relation to a fixed coordinate, we have $$k = k_0 + k(\Delta)\cos(x - \theta)$$

wherein $k_o$ is an average value and $k(\Delta)$ is a function of the eccentric throw $\Delta$ taken from an amplitude of the fluctuation.

For the magnetic flux passing through an area element on the stator tooth surface, we have $$\begin{aligned}
d\Phi/d\chi &= Ag(\chi,t) \cdot \Lambda g(\chi,t) \\
&= A\cos\rho(\chi - \omega_s \cdot t + \alpha_1) \cdot \Lambda_0[1 + \{k_0 + k(\Delta)\cos(\chi - \theta)\} \\
&\quad \cdot \cos N_2(\chi - \omega t + \alpha_2)] \\
&= A \cdot \Lambda_0 \cos\rho(\chi - \omega_s \cdot t + \alpha_1) + A \cdot \Lambda_0 \cdot k_0 \cos N_2(\chi - \omega t + \alpha_2) \\
&\quad \cdot \cos\rho(\chi - \omega_s \cdot t + \alpha_1) + A \cdot \Lambda_0 \cdot K(\Delta) \cdot \cos(\chi - \theta) \cdot \cos N_2(\chi - \omega t + \alpha_2) \\
&\quad \cdot \cos\rho(\chi\,\omega_s \cdot t + \alpha_1)
\end{aligned}$$

For the simplicity, providing $$A \cdot \Lambda_0 = \alpha_1, A \cdot \Lambda_0 \cdot k_0 = \alpha_2, A \cdot \Lambda_0 \cdot k(\Delta) = \alpha_3(\Delta)$$

the foregoing equation is modified by an additive thereon to obtain:

$$\begin{aligned}
d\Phi/d\chi &= a_1 \cos\rho(\chi - \omega_s \cdot t + \alpha_1) + \frac{a_2}{2}[\cos\{(N_2 + \rho)\chi - (N_2 \cdot \omega + \rho\omega_s)t \\
&\quad + (N_2\alpha_2 + \rho\alpha_1)\} + \cos\{(N_2 - \rho)\chi - (N_2\omega - \rho\omega_s)t \\
&\quad + (N_2\alpha_2 - \rho\alpha_1)\}] + \frac{a_3(\Delta)}{4}[\cos\{(N_2 + \rho + 1)\chi - (N_2\omega + 92\,\omega_s)t \\
&\quad + (N_2\alpha_3 + \rho\alpha_1) - \theta\} + \cos\{(N_2 + \rho - 1)\chi - (N_2\omega + \rho\omega_s)t \\
&\quad + (N_2\alpha_2 + \rho\alpha_1) + \theta\} \\
&\quad + \cos\{(N_2 - \rho + 1)\chi - (N_2\omega - \rho\omega_s)t + (N_2\alpha_2 - \rho\alpha_1) - \theta\} \\
&\quad + \cos\{(N_2 - \rho - 1)\chi - (N_2\omega - \rho\omega_s)t
\end{aligned} \tag{IV}$$

The magnetic flux $\Phi t$ passing through one of the arbitrary stator tooth may have an equation of:

$$\begin{aligned}
\Phi_t &= \int_{\chi}^{\chi + \frac{2\pi}{N_1}\beta} d\chi = \int_{\chi}^{\chi + \frac{2\pi}{N_1} \cdot \beta} \left(\frac{d\Phi}{d\chi}\right) d\chi \\
&= \frac{2a_1 \sin\rho\beta\pi/N_1}{\rho} \cdot \cos\rho(\chi - \omega_s t + \alpha_1 + \beta\pi/N_1) \\
&\quad + a_2\left[\frac{\sin(N_2 + \alpha)\beta\pi/N_1}{N_2 + \rho} \cdot \cos\{(N_2 + \rho)(\chi + \beta\pi/N_1)\right. \\
&\quad - (N_2\omega + \rho\omega_s)t + (N_2\alpha_2 + \rho\alpha_1)\} + \frac{\sin(N_2 - \rho)\beta\pi/N_1}{N_2 - \rho} \\
&\quad \left. \cdot \cos\{(N_2 - \rho)(\chi + \beta\pi/N_1) - (N_2\omega - \rho\omega_s)t + (N_2\chi_2 - \rho\alpha_1)\}\right] \\
&\quad + \frac{a_3(\Delta)}{2}\left[\frac{\sin(N_2 + \rho + 1)\beta\pi/N_1}{N_2 + \rho + 1} \cdot \cos\{(N_2 + \rho + 1)(\chi + \beta\pi/N_1) - (N_2\omega + \rho\omega_s t\right. \\
&\quad + (N_2\chi_2 - (\rho\chi_1) - \theta\} + \frac{\sin(N_2 + \rho - 1)\beta\pi/N_1}{N_2 + \rho - 1} \cdot \cos\{(N_2 + \rho - 1)(\chi + \beta\pi/N_1) \\
&\quad - N_2\omega + \rho\omega_s)t + (N_2\alpha_2 + \rho\alpha_1) + \theta\} + \frac{\sin(N_2 - \rho + 1)\beta\pi/N_1}{N_2 - \rho + 1} \\
&\quad \cdot \cos\{(N_2 - \rho + 1)(\chi + \beta\pi/N_1) - (N_2\omega - \rho\omega_s)t + (N_2\alpha_2 - \rho\alpha 1) - \theta\} \\
&\quad + \frac{\sin(N_2 - \rho - 1)\beta\pi/N_1}{N_2 - \rho - 1} \cdot \cos\{(N_2 - 1)(\chi + \beta\pi/N_1) \\
&\quad \left. - (N_2\omega - \rho\omega_s)t + (N_2\chi_2 - \rho\alpha_1) + \theta\}\right]
\end{aligned} \tag{V}$$

wherein $N_1$ is the number of the stator channel, $\Delta$ is a proportion of the tooth width to the pitch of the stator channel.

Hence, the induced voltage e of the detecting coil may have a general equation of:

$$\begin{aligned}
\theta &= -\eta \cdot d\phi\,t/dt \\
&= E_1 \sin\rho(\chi - \omega_s t + \gamma_1) + E_2 \sin\{(N_2 + \rho)\chi - (N_2\omega + \rho\,\omega_s)t + \gamma_2\} \\
&\quad + E_3 \sin\{(N_2 - \rho)\chi - (N_2\omega - \rho\,\omega_s)t + \gamma_3\} \\
&\quad + E_4(\Delta)\sin\{(N_2 + \rho + 1)\chi - (N_2\omega + \rho\,\omega_s)t + \gamma_4 - \theta\} \\
&\quad + E_5(\Delta)\sin\{(N_2 + \rho - 1)\chi - (N_2\omega + \rho\,\omega_s)t + \gamma_5 + \theta\} \\
&\quad + E_6(\Delta)\sin\{(N_2 + \rho + 1)\chi - (N_2\omega - \rho\,\omega Y << \beta)t + \gamma_6 - \theta\} \\
&\quad + E_7(\Delta)\sin\{(N_2 - \rho - 1)\chi - (N_2\omega - \rho\,\omega_s)t + \gamma_7 + \theta\}
\end{aligned} \tag{VI}$$

wherein n is a winding number of the detecting coil.
Thus, we have:

$$E_1 = -\eta \cdot \frac{\omega s}{p} \cdot 2a \; ; \sin p\beta\pi/N_1,$$

$$E_2 = -\eta \cdot \frac{N_2\omega + \rho\omega s}{N_2 + \rho} \cdot a_2 \sin(N_2 + \rho)\beta\pi/N_1,$$

$$E_3 = -\eta \cdot \frac{N_2\omega - \rho\omega s}{N_2 - \rho} \cdot a_2 \sin(N_2 - \rho)\beta\pi/N_1,$$

$$E_4(\Delta) = -\eta \cdot \frac{N_2\omega + \rho\omega s}{N_2 + \rho + 1} \cdot \frac{a_3(\Delta)}{2} \cdot \sin(N_2 + \rho + 1)\beta\pi/N_1,$$

$$E_5(\Delta) = -\eta \cdot \frac{N_2\omega + \rho\omega s}{N_2 + \rho - 1} \cdot \frac{a_3(\Delta)}{2} \cdot \sin(N_2 + \rho - 1)\beta\pi/N_1,$$

$$E_6(\Delta) = -\eta \cdot \frac{N_2\omega - \rho\omega s}{N_2 - \rho + 1} \cdot \frac{a_3(\Delta)}{2} \cdot \sin(N_2 - \rho + 1)\beta\pi/N_1,$$

$$E_7(\Delta) = -\eta \cdot \frac{N_2\omega - \rho\omega s}{N_2 - \rho - 1} \cdot \frac{a_3(\Delta)}{2} \cdot \sin(N_2 - \rho - 1)\beta\pi/N_1,$$

$$\gamma_1 = \alpha + \beta\pi/N_1$$

$$\gamma_2 = (N_2\alpha_2 + \rho\alpha_1) + (N_2 + \rho)\beta\pi/N_1$$

$$\gamma_3 = (N_2\alpha_2 - \rho\alpha_1) + (N_2 - \rho)\beta\pi/N_1$$

$$\gamma_4 = (N_2\alpha_2 + \rho\alpha_1) + (N_2 + \rho + 1)\beta\pi/N_1$$

$$\gamma_5 = (N_2\alpha_2 + \rho\alpha_1) + (N_2 + \rho - 1)\beta\pi/N_1$$

$$\gamma_6 = (N_2\alpha_2 - \rho\alpha_1) + (N_2 - \rho + 1)\beta\pi/N_1$$

$$\gamma_7 = (N_2\alpha_2 - \rho\alpha_1) + (N_2 - \rho - 1)\beta\pi/N_1$$

In the primary embodiment of the invention, three detecting coils are arranged at angular spaces of approximately 120°. Hence, the resultant total induced voltage $e_T$ of the three detecting coils has an equation of:

$$\begin{aligned}
e_T &= e_{\chi=0} + e_{\chi = 2\pi/3} + e_{\chi = -2\pi/3} \\
&= -(1 + 2\cos\rho \cdot 2\pi/3)E_1\sin\rho(\omega_s t - \gamma_1) \\
&\quad - \{1 + 2\cos(N_2 + \rho)2\pi/3\}E_2\{(N_2\omega + \rho\omega_s)t - \gamma_2\} \\
&\quad - \{1 + 2\cos(N_2 - \rho)2\pi/3\}E_3\{(N_2\omega - \rho\omega_s)t - \gamma_3\} \\
&\quad - \{1 + 2\cos(N_2 + \rho + 1)2\pi/3\}E_4(\Delta)\sin\{(N_2\omega + \rho\omega_s)t - \gamma_4 + \theta\} \\
&\quad - \{1 + 2\cos(N_2 + \rho - 1)2\pi/3\}E_5(\Delta)\sin\{(N_2\omega + \rho\omega_s)t - \gamma_5 - \theta\} \\
&\quad - \{1 + 2\cos(N_2 - \rho + 1)2\pi/3\}E_6(\Delta)\sin\{(N_2\omega - \rho\omega_s)t - \gamma_6 + \theta\} \\
&\quad - \{1 + 2\cos(N_2 - \rho - 1)2\pi/3\}E_7(\Delta)\sin\{(N_2\omega - \rho\omega_s)t - \gamma_7 - \theta\}
\end{aligned}$$

Now, the parameter to be multiplied to each term of the foregoing equation VII has been taken into consideration and as a result the following equations were obtained.

First term:
when
$p \neq 3,6,9,12 \ldots$ (not three multiple), $$(1 + 2\cos p \cdot 2\pi/3) = 0$$

$p = 3,6,9,12 \ldots$ (three multiple)

$$(1 + 2\cos p \cdot 2\pi/3) = 3 \quad \text{(VIII)}$$

Second term:
when
$(N_2 + p) \neq 3,6,9,12 \ldots$ we have $$\{1 + 2\cos(N_2 + p)2\pi/3\} = 0$$

when
$(N_2 + p) = 3,6,9,12 \ldots$ we have $$\{1 + 2\cos(N_2 + p)2\pi/3\} = 3 \quad \text{(IX)}$$

Third term:
when
$(N_2 - p) \neq 3,6,9,12 \ldots$ we have $$\{1 + 2\cos(N_2 - p)2\pi/3\} = 0$$

when
$(N_2 - p) = 3,6,9,12 \ldots$ we have $$\{1 + 2\cos -N_2 - p)2\pi/3\} = 3 \quad \text{(X)}$$

Fourth term:
when
$(N_2 + p + 1) \neq 3,6,9,12 \ldots$ we have $$\{1 + 2\cos(N_2 + p + 1)2\pi/3\} = 0$$

when
$(N_2 + p + 1) = 3,6,9,12 \ldots$ we have $$\{1 + 2\cos(N_2 + p + 1)2\pi/3\} = 3 \quad \text{(XI)}$$

Fifth term:
when
$(N_2 + p - 1) \neq 3,6,9,12 \ldots$ we have $$\{1 + 2\cos(N_2 + p - 1)2\pi/3\} = 0$$

when
$(N_2 + p - 1) = 3,6,9,12 \ldots$ we have $$\{1 + 2\cos(N_2 + p - 1)2\pi/3\} = 3 \quad \text{(XII)}$$

Sixth term:
when
$(N_2 - p + 1) \neq 3,6,9,12 \ldots$ we have $$\{1 + 2\cos(N_2 - p + 1)2\pi/3\} = 0$$

when
$(N_2 - p + 1) = 3,6,9,12 \ldots$ we have $$\{1 + 2\cos(N_2 - p + 1)2\pi/3\} = 3 \quad \text{(XIII)}$$

Seventh term:
when
$(N_2 - p - 1) \neq 3,6,9,12 \ldots$ we have $$\{1 + 2\cos(N_2 - p - 1)2\pi/3\} = 0$$

when
$(N_2 - p - 1) = 3,6,9,12 \ldots$ we have $$\{1 + 2\cos(N_2 - p - 1)2\pi/3\} = 3 \quad \text{(XIV)}$$

In consideration of an aspect of the present invention to utilize a voltage $e_T$ as a detecting signal corresponding to the displacement ($O_{16}-O_{20}$) of the rotor 20, the terms 1 to 3 of the voltage $e_T$ represented by the equation (VII) is a signal voltage of the case where there is no eccentric displacement of the rotor 20 and since this signal voltage corresponds to a residual noise and it should desirably be zero.

In the primary embodiment of the invention, the AC rotary electric instrument has the poles of not three multiples, namely $p \neq 3,6,9,12 \ldots$ and hence from the equation (VIII) the first term of the voltage $e_T$ is zero.

Further, when the arbitrary polar logarithm satisfies $p \neq 3,6,9,12 \ldots$, the voltage $e_T$ in the second and third terms will be zero. In this case, it will be appreciated that the channel number $N_2$ of the rotor satisfies $N_2 = 3,6,9,12 \ldots$.

It is therefore preferred to provide the channel number of the rotor in three multiple in order to obtain the best measuring performance of the residual noise.

The fourth to seventh terms of the voltage $e_T$ are the voltages corresponding to the displacement ($O_{16}$–$O_{20}$). However, in consideration of the equations XI to XIV when the channel number of the rotor is three multiple one of the forth and fifth terms remains zero or one of the six or seventh terms remain zero whereas when the channel number of the rotor is not three multiple the fourth to seventh terms except only one term remain zero.

Accordingly, it will also be appreciated that when the displacement of the rotor occurs, the corresponding signal voltage may positively be obtained.

$$\begin{aligned} e_T = & -\{1 + (-1)^p + 2\cos p\pi/2\}E_1 \sin p(\omega_{st} - \gamma_1) \\ & -\{1 + (-1)^{N_2 + p} + 2\cos(N_2 + p)\pi/2\}E_2 \sin\{(N_2\omega + p\omega_s)t - \gamma_2\} \\ & -\{1 + (-1)^{N_2 - p} + 2\cos(N_2 - p)\pi/2\}E_3 \sin\{(N_2\omega - p\omega_s)t - \gamma_3\} \\ & -\{1 + (-1)^{N_2 + p + 1} + 2\cos(N_2 + p + 1)\pi/2\}E_4(\Delta)\sin\{(N_2\omega + p\omega_s)t - \gamma_4 + \theta\} \\ & -\{1 + (-1)^{N_2 + p - 1} + 2\cos(N_2 + p - 1)\pi/2\}E_5(\Delta)\sin\{(N_2\omega + p\omega_s)t - \gamma_5 - \theta\} \\ & -\{1 + (-1)^{N_2 - p + 1} + 2\cos(N_2 - p + 1)\pi/2\}E_6(\Delta)\sin\{(N_2\omega - p\omega_s)t - \gamma_6 - \theta\} \\ & -\{1 + (-1)^{N_2 - p - 1} + 2\cos(N_2 - p -\text{INAREA} \\ & b/2\}E_7(\Delta)\sin\{(N_2\omega - p\omega_s)t - \gamma_7 - \theta\} \end{aligned} \quad \text{(XV)}$$

Moreover, the relationship between the eccentric direction $\theta$ of the rotor 20 and the signal voltage will be described more fully hereinafter.

As will be obvious from the qequation VII of the voltage $e_T$, the eccentric direction $\theta$ appears only as a variation of the phase angle of the signal voltage and is entirely irrelevant to the amplitude of the voltage.

The total induced voltage of the three detecting coils is indicated by a normal AC voltmeter such as a rectifier type voltmeter 35 so that the indicated values are changed only in response to the displacement ($O_{16}$–$O_{20}$) of the rotor 20 and by this change the bearing wear may be measured.

Figure 2:
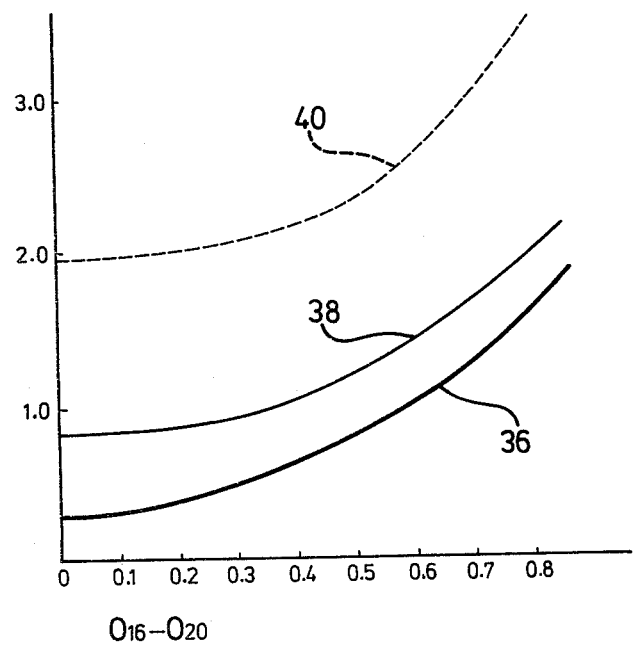
FIG. 2 is a diagram showing characteristic curves of the measured voltages in relation to the eccentricities of the rotor.

FIG. 2 shows characteristic curves of the displacement of the rotor and the measured voltage obtained by one embodiment of the present invention.

The curve 36 is obtained under load free operation at the rotor channel number of $N_2 = 33$ whereas the curves 38 and 40 are obtained with no and full load and at the rotor channel number of $N_2 = 28$.

Figure 3:
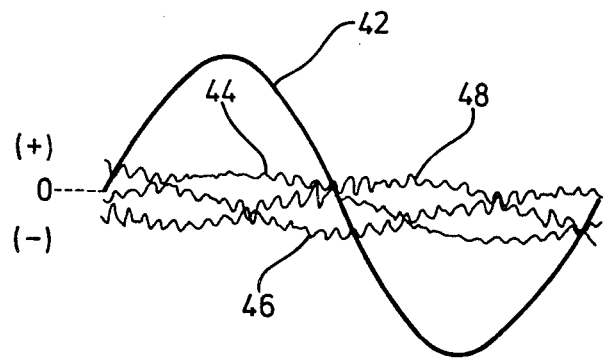
FIGS. 3 to 6 are the oscillograph diagrams of the measured waves.
Figure 4:
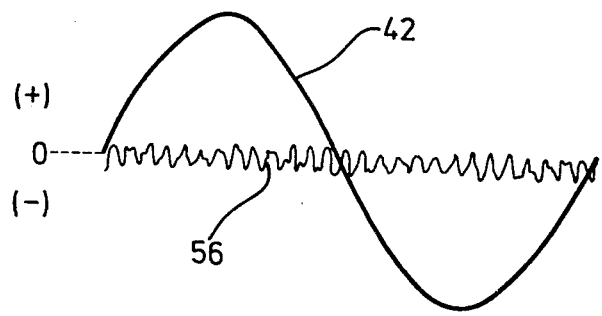
Figure 5:
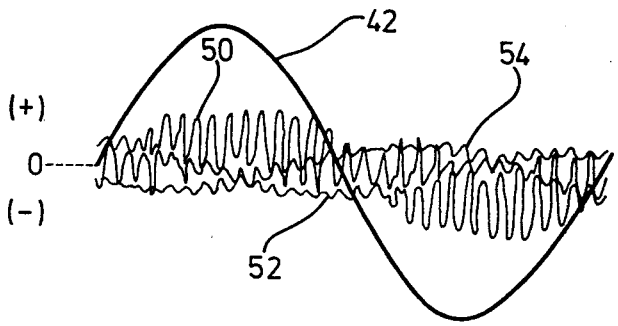
Figure 6:
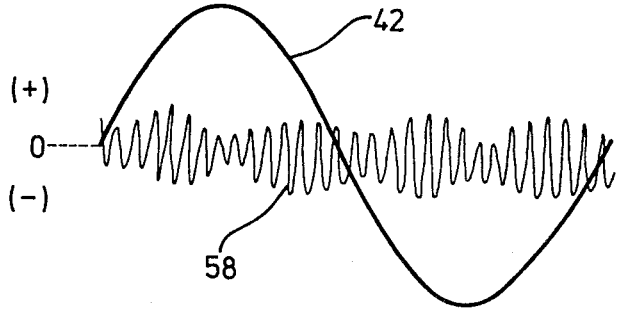

FIGS. 3 to 6 illustrate oscillographs wherein the reference numeral 42 represents a supply voltage, 44 to 48 and 50 to 54 are voltages induced at the detecting coils 10, 12 and 14 and the curves 56 and 58 are obtained by synthesis of the voltage curves 44 to 48 and the voltage curves 50 to 54 which are equivalent to an input voltage of the voltmeter 35. In FIGS. 3 and 4, the displacement of the rotor is substantially zero whereas in FIGS. 5 and 6 the displacement is approximately 0.85 mm.

As hereinbefore fully described, it will be appreciated that the bearing wear detector in accordance with the present invention may not only be applicable to the usual rotary electric instrument having a radial clearance but also the rotary electric instrument having an axial clearance, notwithstanding in the latter type instrument it is preferred in a practical view to measure an increase or decrease of the length of the clearance to be formed due to the thrust bearing wear.

Considering the signal voltage obtained by the foregoing rotary electric instrument in connection with the equation (7), it would be rather effective to measure the signal voltage (the first and second terms) generated by the displacement from the average length of the clearance than to measure the signal voltage generated by the disproportion of the length of the clearance.

Accordingly, when three detecting coils are disposed in the axial clearance of the rotary electric instrument, the number of the rotor channels should preferably be selected from the multiple other than three.

Moreover, in the AC rotary electric instrument having poles of three multiples but not four multiples, four detecting coils are wound around the core at the space angle of approximately 90° and these four detecting coils are connected in series to obtain the resultant voltage, thereby to measure the displacement of the rotor axis.

The total induced voltage of each coil may have equations as mentioned below:

When the number of the rotor channel $N_2$ is an odd number, the above fourth to seventh terms are all disappeared, hence the number of the rotor channel should preferably be selected from the even number.

As hereinbefore fully described, an aspect of the present invention is directed to the fact that the rotor is displaced due to the bearing wear by forming an unbalanced clearance so that there occurs a conspicuous variation in an amplitude of the channel permeance wave of the rotor in the stator core and is hence characterized in that three or four detecting coils are disposed in the stator at substantially equivalent space angles in accordance with the pole number of the main magnetic field, a voltage containing a slot ripple higher harmonic of the rotor is induced at each detecting coils which are connected in series so that an induced voltage of the fundamental harmonic is cancelled to utilize a change of the remaining higher harmonic voltage as a signal corresponding to the bearing wear.

Thus, in accordance with the present invention, an amount of the displacement of the rotor may be positively measured regardless of the direction of the displacement of the rotary axis.

While certain preferred embodiments of the invention have been illustrated by way of example in the drawings and particularly described, it will be understood that modifications may be made in the constructions and that the invention is no way limited to the embodiments shown. For example, while the invention has been described as relating to the electric motor, it would not differ from the present invention to make use of it in connection with a generator.

What is claimed is:

1. A bearing wear detector for an AC rotary instrument having a rotor and a stator, in which stator are defined a plurality of magnetic pole positions, comprising a plurality of detecting coils mounted on said stator approximately uniformly spaced from each other and concentric to the central axis of the stator, the number of said pole positions being other than a multiple of the detecting coils, said detecting coils being connected in series with each and to means for measuring variation in voltage passing therethrough.

2. The detector according to claim 1 wherein the number of poles is not a multiple of three and the number of coils are three, spaced about said stator at approximately 120° from each other.

3. The detector according to claim 2, wherein the number of poles is not a multiple of three and the number of coils is six spaced about said stator at approximately 60° from each other.

4. The detector according to claim 1, wherein the instrument is an electric motor.

5. The detector according to claim 1, wherein the instrument is an electric generator.

6. The detector according to claim 1, wherein the number of poles is not a multiple of four and the number of coils are four spaced about said stator approximately 90° from each other.

7. The detector according to claim 1, wherein the number of poles is not a multiple of four and the number of coils are eight spaced about said stator approximately 45° from each other.

* * * * *